(12) United States Patent
Hanke et al.

(10) Patent No.: US 6,695,108 B1
(45) Date of Patent: Feb. 24, 2004

(54) TORQUE CONVERTER COMPRISING A TORSIONAL VIBRATION DAMPER

(75) Inventors: Wolfgang Hanke, Heidenheim (DE); Franz Brenner, Nattheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/049,337

(22) PCT Filed: Aug. 8, 2000

(86) PCT No.: PCT/EP00/07714

§ 371 (c)(1), (2), (4) Date: Jun. 11, 2002

(87) PCT Pub. No.: WO01/11267

PCT Pub. Date: Feb. 15, 2001

(30) Foreign Application Priority Data

Aug. 10, 1999 (DE) ......................................... 199 37 317

(51) Int. Cl.$^7$ ............................................. F16H 45/02
(52) U.S. Cl. ................. 192/3.29; 192/30 V; 192/55.4; 192/208; 192/212
(58) Field of Search ............................. 192/3.29, 3.3, 192/212, 55.4, 30 V, 208; 464/24

(56) References Cited

U.S. PATENT DOCUMENTS

| | | | |
|---|---|---|---|
| 4,351,167 A | * | 9/1982 | Hanke et al. .................. 464/24 |
| 4,565,273 A | * | 1/1986 | Tojima et al. ............... 192/208 |
| 4,828,533 A | * | 5/1989 | Focqueur et al. ............. 464/24 |
| 4,871,342 A | | 10/1989 | Boss et al. |
| 4,884,996 A | | 12/1989 | Schmitt et al. ............... 464/68 |
| 4,890,706 A | | 1/1990 | Miura et al. ................ 192/3.28 |
| 5,064,042 A | | 11/1991 | Kuhne et al. ............. 192/106.2 |
| 5,097,722 A | * | 3/1992 | Fukushima ................... 74/574 |
| 5,125,486 A | * | 6/1992 | Murata ....................... 192/3.26 |
| 5,180,044 A | * | 1/1993 | Fukushima et al. ......... 192/208 |
| 5,194,045 A | | 3/1993 | Hanke .......................... 464/24 |
| 5,386,896 A | | 2/1995 | Matsuoka .................. 192/3.29 |
| 5,511,640 A | | 4/1996 | Fukunaga .................. 192/3.28 |
| 5,513,731 A | * | 5/1996 | Matsuoka .................. 192/3.29 |
| 5,569,086 A | * | 10/1996 | Fukamachi .................... 464/24 |
| 5,590,752 A | * | 1/1997 | Takehira et al. ............. 192/208 |
| 5,595,539 A | * | 1/1997 | Yamamoto .................... 464/24 |
| 5,609,231 A | | 3/1997 | Matsuoka |
| 5,730,656 A | * | 3/1998 | Yamamoto .................... 464/24 |
| 5,743,371 A | * | 4/1998 | Takehira et al. ............. 192/208 |
| 6,003,648 A | | 12/1999 | Sudau |
| 6,126,568 A | | 10/2000 | Sudau |
| 6,193,611 B1 | * | 2/2001 | Hanke et al. .................. 464/68 |

FOREIGN PATENT DOCUMENTS

| | | |
|---|---|---|
| DE | 36 35 043 C1 | 7/1988 |
| DE | 3827249 | 2/1989 |
| DE | 39 16 575 C1 | 11/1990 |
| DE | 39 23 749 C1 | 2/1991 |
| DE | 3923749 | 2/1991 |
| DE | 4106414 | 9/1991 |
| DE | 4109485 | 9/1992 |
| DE | 19527527 | 2/1996 |
| DE | 19736843 | 8/1997 |
| DE | 19803221 | 1/1998 |
| DE | 19736843 | 3/1999 |
| DE | 19739634 | 3/1999 |
| DE | 19803221 | 7/1999 |
| EP | 0450505 | 10/1991 |
| EP | 0476803 | 3/1992 |
| EP | 0732527 | 9/1996 |
| JP | 06137403 | 5/1994 |

* cited by examiner

*Primary Examiner*—Saul Rodriquez
(74) *Attorney, Agent, or Firm*—Ostrolenk, Faber, Gerb & Soffen, LLP

(57) ABSTRACT

The invention relates to a starting unit for use in drive systems, especially of motor vehicles, which comprises a hydrodynamic speed/torque converter including at least one pump wheel, one turbine wheel and one stator, and comprises a torque converter lockup clutch. The output ends of the torque converter lockup clutch and of the speed/torque converter are interconnected in a rotationally fixed manner. In addition, a device for damping vibrations is provided which comprises at least one torsional vibration damper with hydraulic damping.

18 Claims, 6 Drawing Sheets

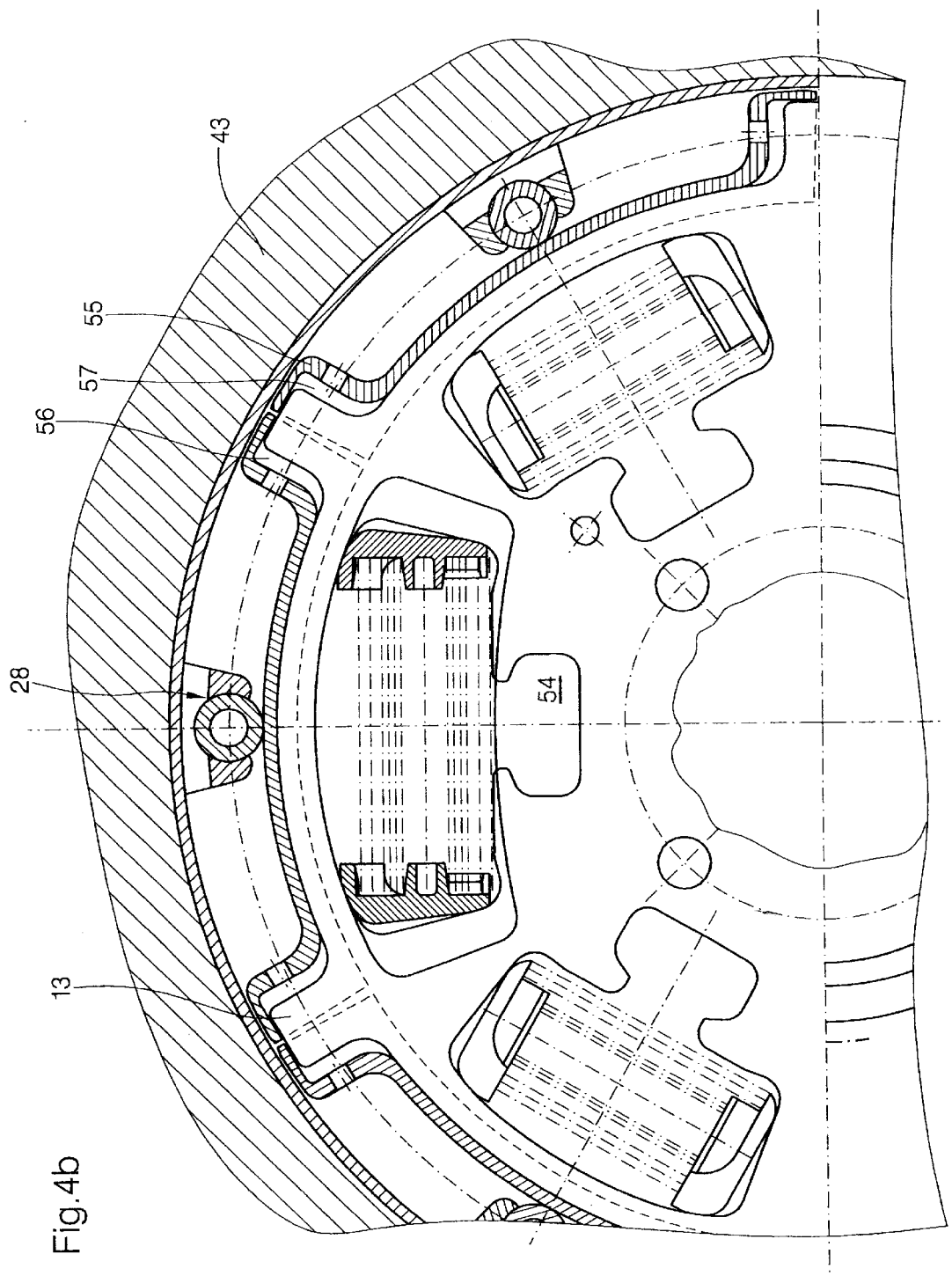

TORQUE CONVERTER COMPRISING A TORSIONAL VIBRATION DAMPER

BACKGROUND OF THE INVENTION

The invention relates to a starting unit for use in drive systems, in particular for use in transmissions of vehicles, specifically having a hydrodynamic coupling and a lockup clutch.

Transmissions for use in vehicles, in particular in the form of automated manual transmissions or automatic transmissions, are known in a wide range of designs. A common factor of these variants is generally that the starting operation is effected by means of a clutch element in the form of a friction clutch or of a hydrodynamic converter. To effect power transmission in the other gear ratios, mechanical speed/torque conversion devices in various designs are generally connected downstream of these starting units. To avoid the introduction of torsional vibrations into the drive train, in particular into the transmission unit, there are generally devices for vibration damping, for example in the form of a torsional vibration damper, which are connected upstream of the transmission unit or are integrated in the latter in the region of the transmission input shaft. However, known integrated solutions involve the use of a vibration damper which is used only to compensate for or shift vibrations or additionally operates according to the friction damping principle. However, solutions of this type do not always give satisfactory results; in particular, stick-slip effects mean that it is impossible to completely rule out excitation of vibration during critical operating states of the drive train. A further drawback is that the intensity of damping achieved by damping devices of this type cannot be varied, or can only be varied with a very high level of outlay, over the operating range. Furthermore, the increasing demands with regard to environmental protection aimed at reducing emissions mean that the hydrodynamic converter in the transmission unit has to be closed earlier, with the result that the vibration excitation is considerably increased.

SUMMARY OF THE INVENTION

The invention is therefore based on the object of further developing a starting unit for a transmission unit for use in drive systems of vehicles in such a manner that vibration excitation is avoided in virtually any operating state, and its damping performance allows the possibility of adjustment. The space taken up is to be minimal, and the entire starting unit is to be suitable for achieving a high degree of standardization. Furthermore, it is to be distinguished by a low outlay on design control and is to be easy to integrate into the drive system or a force transmission unit, for example in the form of a geared transmission unit.

The solution according to the invention is described below.

The starting unit comprises a starting element in the form of a hydrodynamic speed/torque converter and a lockup clutch, the output sides of which are at least indirectly connected to one another in a rotationally fixed manner. Furthermore, there is a device for vibration damping, comprising at least one torsional vibration damper with hydraulic damping.

The torsional vibration damper is preferably connected functionally downstream of the lockup clutch, during force transmission in traction mode as seen from the drive to the output of the starting unit. The output ends of lockup clutch and speed/torque converter are for this purpose at least indirectly connected to one another in a rotationally fixed manner. In addition to the fact that a torsional vibration damper with hydraulic damping operates without wear, its use in a starting unit in a drive train offers the advantage that, on account of the avoidance of the sticking phases which are present when using a mechanical damping device in the form of a friction damper, excitation to vibrate can be virtually ruled out over the entire operating range. It is easy to adjust the damping intensity by means of the viscosity of the damping medium used or by varying the gap geometries, involving very little outlay. The damping which is established is also proportional to vehicle speed, which means that high frequencies or high amplitudes lead to a high level of damping.

The device for vibrational damping preferably comprises only one torsional vibration damper with hydraulic damping. In the installed position, during force transmission in traction mode, and as seen from the drive, the device for vibration damping, or at least the torsional vibration damper, is arranged:

a) spatially in front of the hydrodynamic speed/torque converter and behind the lockup clutch, or b) spatially in front of the hydrodynamic speed/torque converter and in the same plane as the lockup clutch, or c) spatially in front of the hydrodynamic speed/torque converter and the lockup clutch, or d) spatially behind the hydrodynamic speed/torque converter and the lockup clutch.

In a particularly advantageous configuration of the starting unit, the device for vibration damping, in particular the torsional vibration damper with hydraulic damping, is part of the lockup clutch.

The torsional vibration damper with hydraulic damping functions as a highly elastic clutch, i.e. a clutch with a low rigidity for torque transmission between the drive of the starting unit and the output. The torsional vibration damper with hydraulic damping comprises a primary part, which can be at least indirectly coupled in a rotationally fixed manner to the drive or the output of the starting unit, and a secondary part, which can be at least indirectly coupled to the output or the drive, it being possible to couple the primary part and secondary part to one another by means of at least one damping coupling and spring coupling. For this purpose, there are first means for effecting a spring coupling and further second means for effecting a damping coupling, a functional division between the means for effecting the spring coupling and the further, second means for effecting the damping coupling preferably being provided. It is also conceivable for the functions to overlap. The means for spring coupling are used to effect the function of an elastic clutch. However, the term spring coupling is not to be understood as meaning only connection options using spring devices, but also any connecting elements which have a spring characteristic or an elastic behavior. The first means for effecting the spring coupling and the second means for effecting the damping coupling are preferably arranged in separate chambers which are arranged spatially apart from one another and are formed between the primary part and the secondary part. The means for effecting the damping coupling comprise at least one chamber which can be filled with hydraulic fluid and/or another damping medium and which in turn may be assigned means for influencing the damping performance. However, designs with an at least partial functional overlap between the means for spring coupling and the means for damping coupling are also conceivable.

The means for influencing the damping performance preferably comprise at least one throttle point which is assigned to a damping chamber and is integrated in the device for vibration damping or the torsional vibration damper with hydraulic damping. It is preferable for the throttle point to be arranged directly in the damping chamber.

An embodiment of a torsional vibration damper which is particularly compact and reliable in terms of its operation also comprises further, third means for limiting the twisting angle between primary part and secondary part, which are assigned to the damping chamber and divide the damping chamber into at least two part-chambers, which are connected to one another via at least one throttle point, the third means being involved in the formation of the throttle point. The following options exist in connection with the formation of the throttle point:

a) Integration of the throttle point in the third means;
b) Formation of the throttle point between the third means and the spatial limits of the damping chamber formed by the primary part and the secondary part.

This embodiment allows the damping performance to be influenced automatically by influencing the quantities of damping media which are contained in the individual part-chambers and are effected when the primary part rotates in the peripheral direction with respect to the secondary part. For this purpose, the third means are arranged fixed in the peripheral direction either on the primary part or the secondary part, and extend into the damping chamber. The third means may comprise, for example, at least one projection which is arranged on the secondary part and engages in cutouts in the primary part, in the peripheral direction in the installed position, in such a manner that the projection can be displaced relative to the primary part. The cutouts on the primary part, in the peripheral direction, then form a stop for the projection of the secondary part. In a similar way, the projection may also be formed on the primary part and may engage in the recesses on the secondary part which are required to form the damping chamber. For torque transmission, at least one compression spring device, which is preferably arranged and becomes active in the peripheral direction, is provided between the primary part and the secondary part. Furthermore, means for damping rotary vibrations, which counteract movement of the primary part relative to the secondary part and which, through the relative movement of the primary part with respect to the secondary part, convert work performed by the thrust forces into heat, for example, are arranged between the primary part and the secondary part.

In a further advantageous embodiment, there is provision for the damping medium to be introduced in the region of the device for limiting the twisting angle. It is also possible for the space between primary part and secondary part to be completely filled, in addition or by taking over responsibility for the function of the damping chamber.

Hydraulic fluid as damping medium can be supplied on a one-off basis from the outside, can be supplied during operation one or more times or the supply can be effected by exchange via a hydraulic-fluid supply system. Furthermore, the supply can be effected on a one-off basis by means of a separate operating-medium supply device, i.e. by means of dedicated damping filling, or directly from the unit which is to be damped, via corresponding supply lines. In this context, it is also conceivable to form a circuit which enables the hydraulic fluid to be kept at a constant temperature at all times. In this case, it is even possible to use hydraulic fluids of lower quality as damping medium.

The lockup clutch is preferably a mechanical clutch of disk design which is in the form of a wet multidisk clutch. This means that the disks run under wet conditions. This is easy to achieve by the operating medium located outside the working space of the hydrodynamic speed/torque converter simultaneously being used as lubricant for the lockup clutch. This is generally operating medium which has accumulated in the operating-medium sump of the converter or in a storage chamber. In this case, there is no need to provide additional sealing measures between converter and lockup clutch, and the lockup clutch can easily be integrated in the housing of the converter, in which case an operating-medium supply source can be used for two different functions, namely the function of the hydrodynamic converter as a starting element and the lubrication of the lockup clutch. This results in a structural form of a wear-free starting element which is particularly compact in terms of its structure and functionality.

An advantageous further development of the above embodiment consists in the damping medium for the torsional vibration damper also being formed by the operating medium of the converter or the lubricant of the lockup clutch.

A particularly advantageous configuration of the starting unit consists in the function of the clutch input or output disk of the lockup clutch being assigned to an element, primary part or secondary part of the torsional vibration damper, so that it is possible to achieve a particularly compact design of the starting unit with regard to the overall length required. The number of connections to be produced between the individual elements is greatly reduced. It is preferable for the primary part to form the clutch output disk of the lockup clutch and for the secondary part to be connected to the turbine part of the hydrodynamic speed/torque converter.

In a further, particularly advantageous configuration, to more finely tune the damping performance to the individual operating ranges in the interior space, which is filled with a damping medium, between the two components primary part and secondary part, what is known as a floating damping ring is provided, which is not connected in a positively-locking manner to either of the two masses. This floating damping ring forms at least one first displacement chamber with a first component, for example the primary part or secondary part, and forms at least one second displacement chamber with the second component, i.e. the secondary part or the primary part. In this way, the floating damping ring is exposed to a free play of forces during the relative movement of primary part and secondary part, during which it can in each case be rotated to a limited extent with respect to each of the two components. Taking account of the fact that the floating damping ring is supported by the damping medium and also of the available gap cross sections, it is then possible for only one displacement chamber to be active in the damping in the event of low vibration amplitudes. The damping is in this case deliberately maintained at a low level, in order to achieve the required damping isolation. In the event of high damping amplitudes, in particular including in the event of a relatively low damping frequency, the second displacement chamber is active, specifically whenever the limited rotatability of the floating damping ring with respect to one of the two components has been fully utilized and the ability of the floating damping ring to rotate with respect to the other component is still available. On account of the gap geometries, the damping in this range is kept at a high level, in order to greatly damp relatively high vibration amplitudes. The damping ring itself may be of single-part design or may be of multipart design, as seen in the peripheral direction.

The lockup clutch and hydrodynamic speed/torque converter are preferably connected in parallel, but are never in joint use or engagement. The advantage of an arrangement of this type is that it is substantially only possible to differentiate between in each case two states with regard to the power transmission from the drive to the output, the power transmission taking place either purely mechanically from the drive of the starting unit via the lockup clutch to the output of the drive unit or hydrodynamically via the hydrodynamic speed/torque converter. By suitable actuation of the hydrodynamic component, this allows the advantages of hydrodynamic power transmission for certain driving states, in particular for the starting state, to be fully exploited. This can take place completely without wear, while in all other driving states a complete lockup is produced.

The integration according to the invention of the device for vibration damping, comprising at least one torsional vibration damper with hydraulic damping action, in the starting unit makes it possible to create a multifunctional drive component which takes up little space, these elements preferably being integrated in a common housing. The common housing used in this case may be a) the housing of the hydrodynamic speed/torque converter, or
b) a housing of the connection elements, in particular of the lockup clutch, or
c) the housing of the power transmission unit, in particular of a transmission.

In cases a) and b), it is possible, according to a further advantageous configuration of the invention, to create a modular unit, which can be handled independently, comprising a drive end and an output end.

The specific design embodiment of the torsional vibration damper with hydraulic damping is left up to the person skilled in the art and depends on the particular requirements in use.

The coupling of the output end to the connection elements, for example a speed/torque conversion device of a power transmission unit, in particular of a geared transmission unit, especially the mechanical transmission part of a geared transmission unit, and of the drive end of the starting unit to the transmission input shaft or to the driving engine or some other element arranged between the driving engine and the starting unit is effected by a non-positive and/or positive lock. In the most simple arrangement, the entire modular unit is fitted onto the transmission input shaft or, if the transmission input shaft is formed by the drive end of the starting unit, onto the input of the following transmission means, in the case of geared transmission units the downstream speed/torque conversion device. Other embodiments for producing a rotationally fixed connection between the drive of the starting unit and the transmission input shaft are conceivable and are within the ability of the appropriate person skilled in the art.

There are also a wide range of options with regard to the design of the lockup clutch. It is generally designed as a mechanical friction clutch, preferably of multidisk design. In this case, it comprises at least one clutch input disk and a clutch output disk which can be brought at least indirectly into operative connection with the clutch input disk and which is connected in a rotationally fixed manner, at least indirectly, i.e. either directly or with further transmission means in between, to the output of the starting unit. If the device for vibration damping is designed as part of the lockup clutch, the clutch output disk is formed by the device for vibration damping. In this case, the coupling to the output of the starting unit is effected via the device for vibration damping, which is connected in a rotationally fixed manner to the output of the speed/torque converter, in particular the turbine wheel.

The rotationally fixed connection between the output ends of the hydrodynamic speed/torque converter, in particular of the turbine wheel and of the lockup clutch, can be effected releasably or non-releasably in terms of mounting. The connection itself may in the former case be of positively and/or non-positively locking design. In the second case, the rotationally fixed connection is effected either by material-to-material bonding or by a design as an integral unit of the turbine wheel of the hydrodynamic speed/torque converter and output of the lockup clutch, i.e. of clutch output disk. The type of connection is selected according to the design which is to be used for the hydrodynamic speed/torque converter and/or for the lockup clutch and the specific requirements in use. This statement also applies, in a similar way, to the production of the rotationally fixed connection between the device for vibration damping and the output or, when the clutch output disk of the lockup clutch is designed in the form of the device for vibration damping, to the connection between the device for vibration damping and the hydrodynamic speed/torque converter.

BRIEF DESCRIPTION OF THE DRAWINGS

The solution according to the invention is explained below with reference to Figures which, in detail:

FIGS. 4a and 4b illustrate a further possible design of a device for vibration damping with floating damping ring.

DESCRIPTION OF PREFERRED EMBODIMENTS

Figure 1:
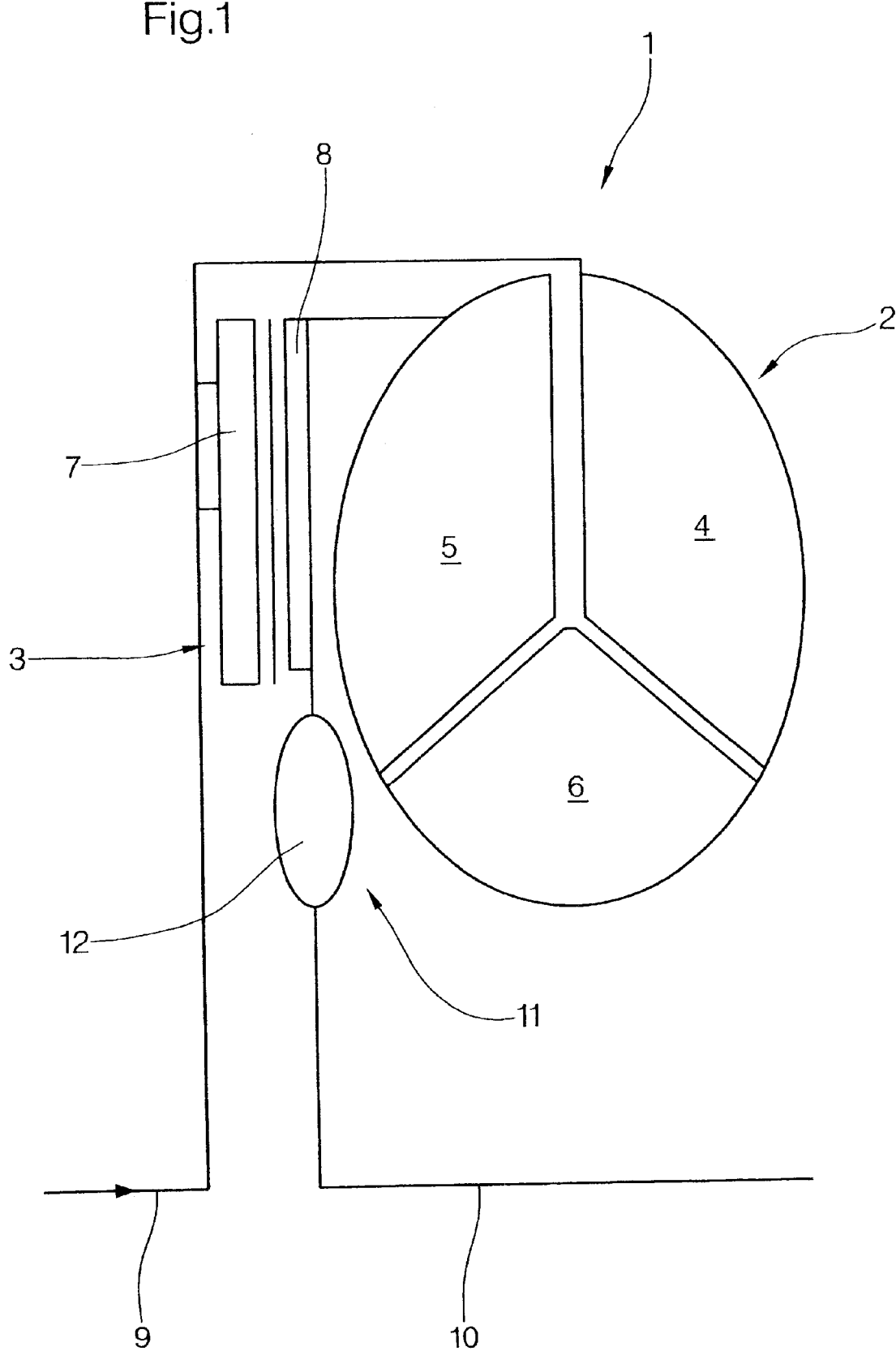
FIG. 1 shows a diagrammatically simplified illustration of the basic structure of a starting unit according to the invention, with a device for vibration damping arranged between lockup clutch and hydrodynamic speed/torque converter.

FIG. 1 shows a diagrammatically simplified illustration of the basic structure of a starting unit 1 which is designed in accordance with the invention. It comprises at least one hydrodynamic speed/torque converter 2 and a lockup clutch 3. The hydrodynamic speed/torque converter 2 and the lockup clutch 3 are connected in parallel. The speed/torque converter comprises at least one pump wheel 4, a turbine wheel 5 and a stator 6. Embodiments with a plurality of stators are also conceivable. The lockup clutch 3 is preferably designed as a disk clutch, preferably in the form of a multidisk clutch. The multidisk clutch comprises at least one clutch input disk 7 and a clutch output disk 8, which can be brought into operative, frictionally locking connection with one another, at least indirectly. The starting unit 1 also comprises a drive 9, which can be coupled at least indirectly to a driving engine (not shown in detail here), and an output 10, which can be coupled, at least indirectly, to the output of the drive system. The drive 9 and the output 10 are generally, although not necessarily, designed in the form of solid or hollow shafts. Furthermore, according to the invention the output sides of the hydrodynamic speed/torque converter 2 and of the lockup clutch 3 are connected to one another in a rotationally fixed manner, at least indirectly with a device for vibration damping 11, comprising at least one torsional vibration damper with hydraulic damping 12, connected in between. In this case, the turbine wheel 5 functions as the output end of the hydrodynamic speed/torque converter 2, and the clutch output disk 8 functions as the output end of the lockup clutch 3. As a result, when used in vehicles in traction mode, i.e. when power is being transmitted from a driving engine to the wheels which are to be driven, in the case illustrated the power flow via the starting unit 1 takes place either through the hydrodynamic speed/torque converter 2 or through the lockup clutch 3. The output of the hydrodynamic speed/torque converter, i.e. the turbine wheel 5 and the output of the lockup clutch 3, i.e. the clutch output disk 8, are for this purpose at least indirectly connected in a rotationally fixed manner to the output 10 of the starting unit 1 which, when the starting unit 1 is integrated in a transmission unit, simultaneously functions as the drive or input of a downstream speed/torque conversion device, for example in the form of a mechanical transmission unit, comprising at least one set of planet gears and/or a set of spur gears, and is formed, for example, by a shaft.

The spatial arrangement of the lockup clutch 3 with respect to the speed/torque converter 2 is effected, when the starting unit 1 is integrated in a drive train, in the installed position, as seen in the direction of flow of forces, spatially in front of the speed/torque converter 2. The starting operation is effected through actuation or commencing power transmission via the hydrodynamic speed/torque converter 2. The lockup clutch 3 is not actuated in this state. The hydrodynamic speed/torque converter 2 is responsible for the substantially wear-free transmission of the moment of the driving engine, which is coupled to the starting unit 1, to the elements which are to be driven. Depending on the design of the speed/torque converter 2, once a certain gear ratio has been reached, it is locked up by coupling pump wheel 4 and turbine wheel 5 by means of the lockup clutch 3. The advantages of the hydrodynamic power transmission using a speed/torque converter are in this way fully utilized where there are high rotational speed differences, i.e. in the starting range, while in all other driving states, in which hydrodynamic power transmission would have an adverse effect on the overall efficiency, the hydrodynamic part is removed from the power flow and, after the starting operation has ended, the power is transmitted to the output 10 and therefore, when used in vehicles, to the wheels substantially without losses as a result of closure of the lockup clutch 3. In particular, in this context reference is made to the possibility of virtually wear-free transmission in the high-slip range over a very long period of time.

Figure 2:
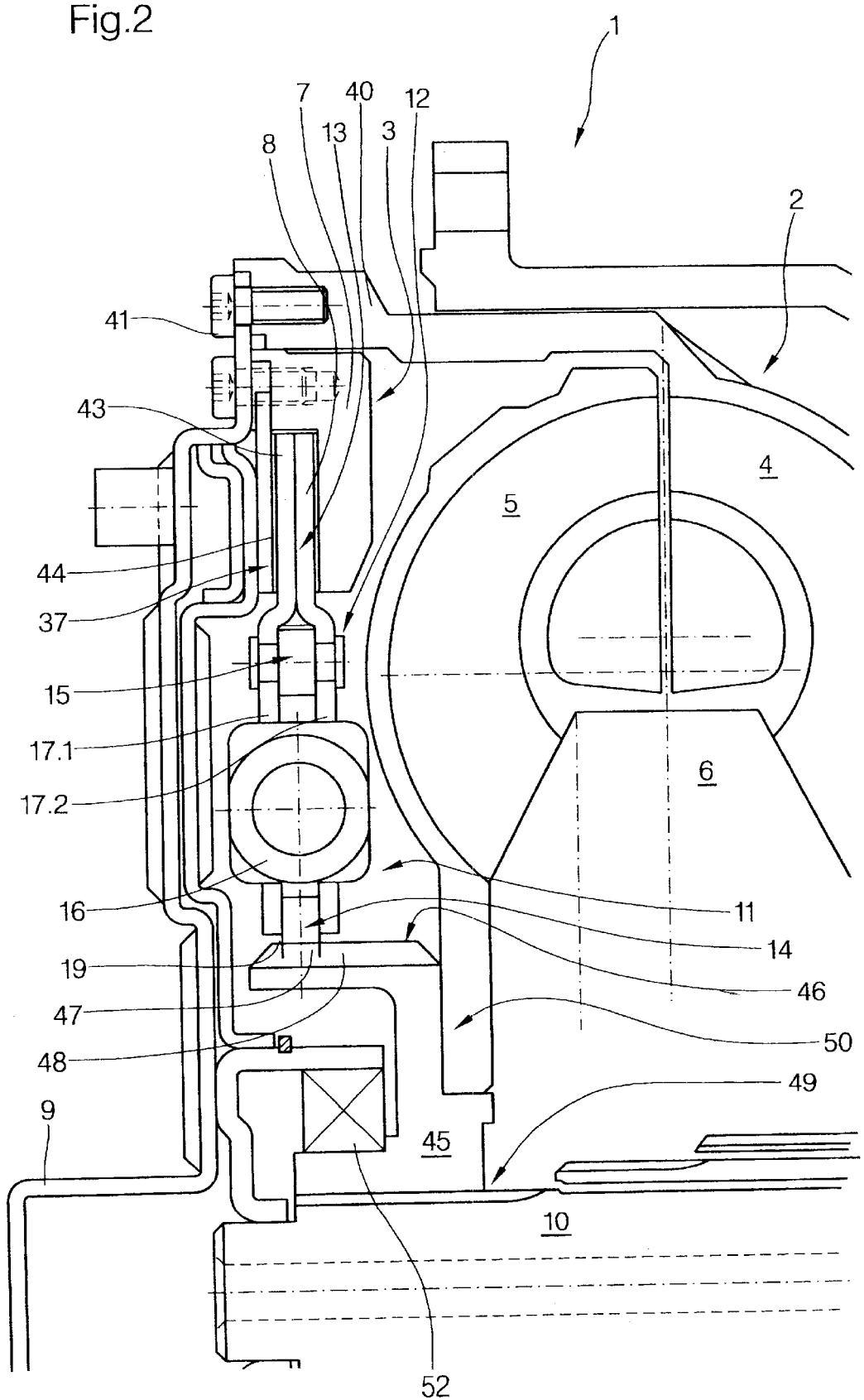
FIG. 2 illustrates a structural design of the starting unit according to the invention, with the advantageous configuration of the device for vibration damping being integrated in the form of a hydraulic vibration damper in the lockup clutch.
Figure 3A:
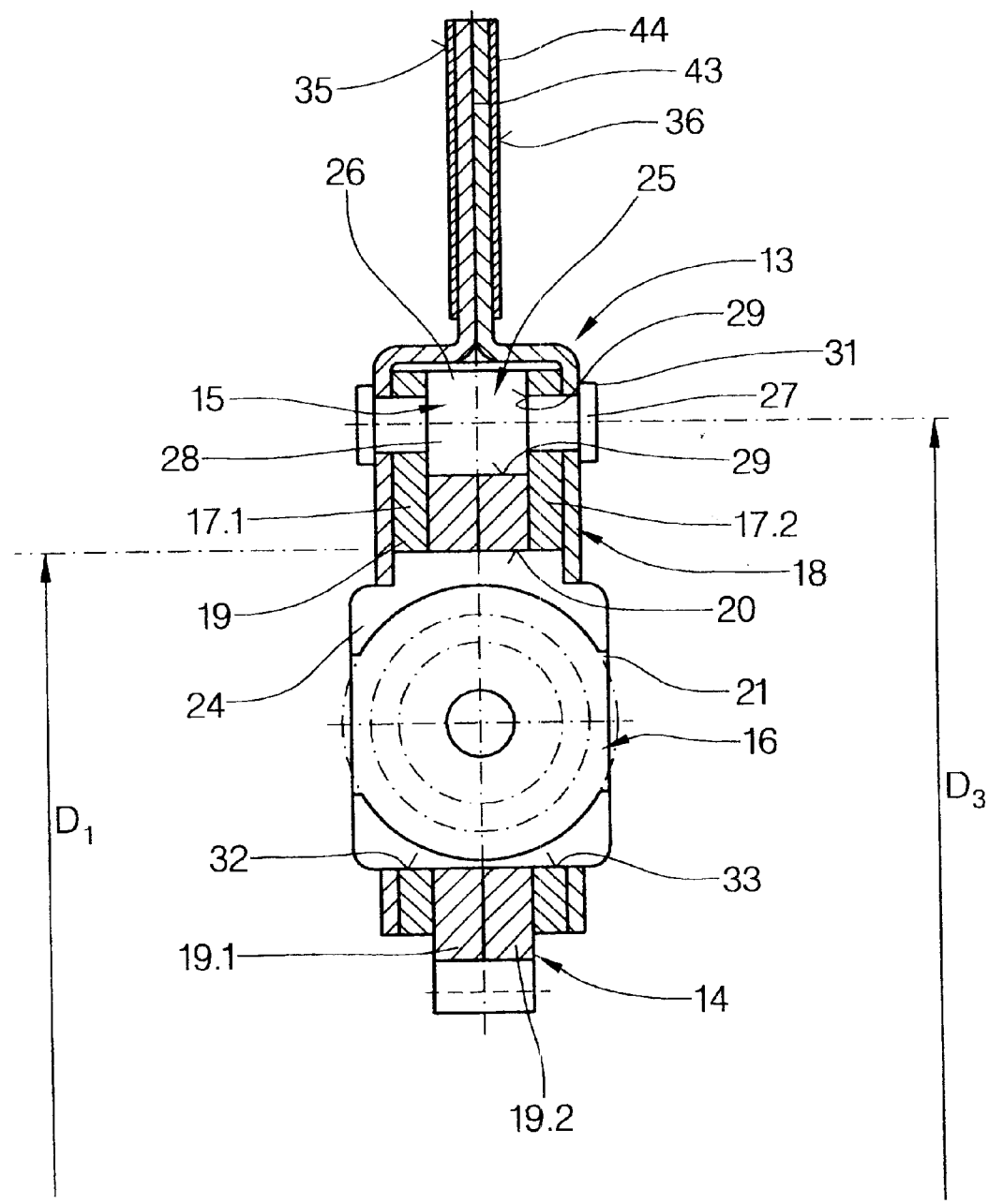
FIGS. 3a and 3b illustrate a possible design of the hydraulic vibration damper.
Figure 3B:
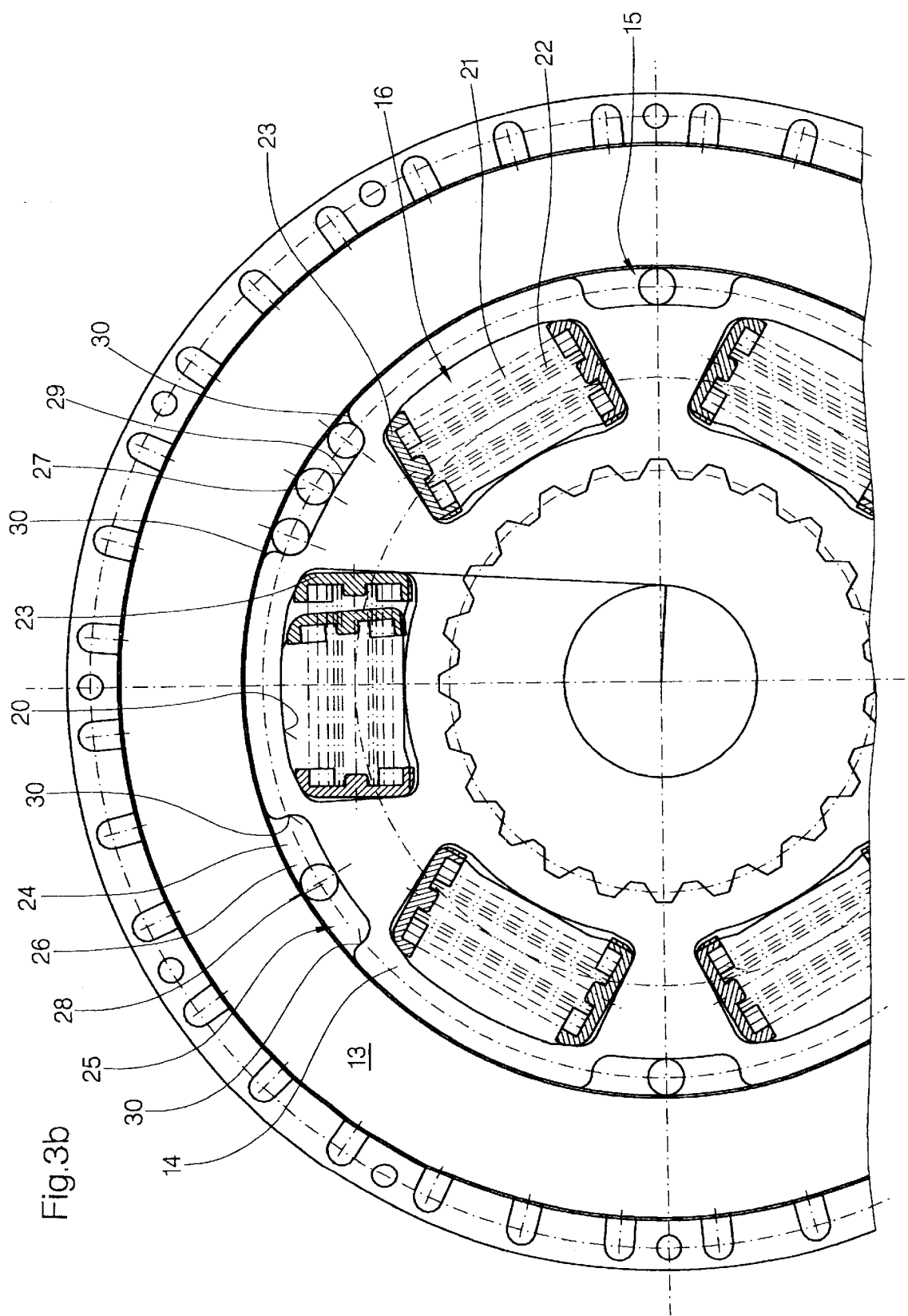

The torsional vibration damper with hydraulic damping 12 which is provided in accordance with the invention comprises, as illustrated in FIGS. 2 and 3, at least one primary part 13 and a secondary part 14, which can rotate in the peripheral direction relative to one another and have means for damping coupling 15 and means for spring coupling 16. The device for damping vibrations 11 is responsible for the function of damping vibrations between the drive end and output end or the elements connected to primary part 13 and secondary part 14. The elastic clutch displaces resonances and therefore has an insulating effect. In the situation illustrated, when integrated in the driving unit 1, the device for vibration damping 11 is functionally assigned to the output 10. For this purpose, the torsional vibration damper with hydraulic damping 12 is at least indirectly connected in a rotationally fixed manner to the output 10, preferably by means of a shaft which is connected in a rotationally fixed manner to the output 10, in which case, both when power is being transmitted via the lockup clutch 3 and when power is being transmitted via the hydrodynamic speed/torque converter 2, the torsional vibration damper 12 is active behind these components. Seen purely on a spatial basis, in the installed position, the torsional vibration damper 12 is arranged between the lockup clutch 3 and the hydrodynamic speed/torque converter 2. The components hydrodynamic speed/torque converter 2, lockup clutch 3 and hydraulic torsional vibration damper 12 preferably form a modular unit which can be preassembled and can be offered and handled as an independent assembly. This can then be integrated, for example, as a module in a transmission, it being possible to effect the integration by fitting the module on, flanging it on or using any other form of connection. With regard to the specific design of a torsional vibration damper with hydraulic damping, reference is made to FIGS. 3a and 3b.

FIG. 2 illustrates a particularly advantageous structural design of the starting unit 1, in which the torsional vibration damper with hydraulic damping 12 is integrated in the lockup clutch 3 or forms a structural unit therewith. The basic structure corresponds to that which is described in FIG. 1, for which reason identical reference symbols are used for identical components. The primary part 13 of the torsional vibration damper with hydraulic damping 12 in this case, in the most simple scenario, comprises two elements 17.1 and 17.2 in disk form. The secondary part 14 comprises at least one element 19 in disk form. The primary part 13 is lengthened in the radial direction, preferably in the form of at least one element 43 which is in disk form and forms the clutch output disk 8 of the lockup clutch 3. For interaction of clutch input disk 7 and clutch output disk 8, at least one of the two elements is provided in the operative region, i.e. the region which comes into contact with in each case the other element when pressure is exerted, with a friction lining 44. The terms clutch input disk 7 and clutch output disk 8 are not necessarily linked to these elements being designed as disks; rather, what is meant is that these elements at least have regions in disk form, in order to form a non-positively locking connection, in particular in the form of a disk clutch. The secondary part 14 is connected to the output 10 in a rotationally fixed manner, preferably by means of an adapter element 45, which simultaneously serves to bear or support the turbine wheel 5 of the hydrodynamic speed/torque converter 2. The rotational fixed connection can be effected in various ways; positively and/or non-positively locking connections are conceivable. In the case illustrated, the rotationally fixed connection between secondary part 14 and adapter element 45 is effected by means of toothing 46. For this purpose, the secondary part 14, in the radially inner region in the installed position, has internal toothing 47, and the adapter element 45, in the radially outer region, has outer toothing 48. The rotationally fixed connection 49 between adapter element and output 10 is effected, for example, in the form of a splined shaft connection. A rotationally fixed coupling 50 between turbine wheel 5 and adapter element 45 is effected, for example, by means of a press-fit connection. However, other embodiments are also conceivable. In a particularly advantageous embodiment, which is not shown here, adapter element 45 and secondary part 14 and/or adapter element 45 and turbine wheel 5 form a structural unit. This means that the respective end regions of turbine wheel 5 and/or secondary part 14 are to be designed accordingly. Output 10 or the entire starting unit 1 is supported in a housing 51, for example by means of the bearing arrangement 52. The housing 51 in this case corresponds either to a housing part 39 which surrounds the starting unit 1 or to the transmission housing.

The pressure or the realization of the frictionally locking connection between clutch input disk 7 and clutch output disk 8 is effected, for example, by pressure exerted by means of a piston element 37, which acts directly on either the clutch input disk 7 or the clutch output disk 8.

FIGS. 3a and 3b illustrate a specific structural design of the torsional vibration damper with hydraulic damping 12. The two disk-like elements 17.1, 17.2 of the primary part 13 form a first part 19 of the primary part 13, which is connected to a second part 18 in the form of a housing part via connecting elements 27. The secondary part 14 comprises two disk-like elements 19.1 and 19.2. The secondary part 14, in the peripheral direction, has recesses 20, which are preferably designed in the form of passage openings, on a specific diameter D1. The coupling between the primary part 13 and the secondary part 14 for torque transmission is effected via the means for spring coupling 16, which comprise at least one spring device 21 having at least one spring element 22. These spring elements 22 of the spring device 21 are for this purpose arranged in the recesses 20 in the secondary part 14, extend in the peripheral direction of the secondary part 14 and are supported on the primary part 13. The arrangement, design and function of the spring elements 22 is explained in more detail in FIG. 3b. The function of the spring device 21 is for torque to be transmitted to the secondary part 14 at least throughout the entire operation, in order for the secondary part to be set in rotation and in order to shift the resonant frequencies.

The spring devices 21 are supported, for example, on spring cups 23 between primary part 13 and secondary part 14. With regard to the specific design of the individual elements, reference may be made to the statements given in documents DE 36 35 043 which corresponds to U.S. Pat. No. 4,884,996 and DE 39 16 575 which corresponds to U.S. Pat. No. 5,064,042, the content of disclosure of which in this respect is hereby incorporated in its entirety in the present application. For example, it is conceivable for the primary part 13 to have window-like cutouts 53 which run in the peripheral direction at a specific diameter D2 and, with regard to their spacing and size, are substantially complementary to the cutouts 20, which accommodate the spring devices 21, on the secondary part 14, and, in the installed position, are offset with respect to the secondary part, in the peripheral direction and in the load-free state, by approximately half the extent of the recess, as seen in the peripheral direction. Both parts then engage tangentially on the spring devices 21 or, as illustrated in FIG. 3b, on the guide pieces associated with the ends of these devices, in the form of spring-carrying cups 23. The same also applies to the cutouts 20 on the secondary part 14.

In the event of longitudinal and/or rotatory vibrations occurring in the starting unit 1, in particular from the drive, these vibrations are introduced into the secondary part 14 via the rotationally fixed coupling of the primary part 13, with the lockup clutch 3 engaged. Then, under the action of a torsional moment while the rotating component is operating, the spring devices 21 are pressed together, and therefore a relative movement takes place between the primary part 13 and the secondary part 14, leading to a certain twisting angle α being set. When passing through resonances and, for example, in the event of sudden loads, high relative movements occur between primary part and secondary part, and these relative movements are superimposed on the twisting angle α.

To damp these relative movements between the primary part 13 and the secondary part 14, there are means 15 for damping coupling. These comprise at least one hydraulic fluid which can be introduced at least into a partial region of an intermediate space 24 which is formed between the primary part 13 and the secondary part 14. The intermediate space 24 may be filled in such a manner that either only the region in which the spring devices 21 are located or also additional chambers 25 which are formed between primary part 13 and secondary part 14 is/are filled, or the entire intermediate space between the primary part 13 and the secondary part 14 is filled. In the situation illustrated, special damping chambers are provided. These are denoted by 26. The damping chamber 26 may in this case be formed between the sleeve 28, which surrounds the connecting element 26, and a slot 29 in the secondary part 14. There is a very wide range of different options for the actual filling with hydraulic fluids. One conceivable option (not shown here) is for supply to take place via a suitable hydraulic-fluid feed device, or for the intermediate space 24 to be filled on a one-off basis. However, it is theoretically also possible, although not illustrated here, for the feed or supply of hydraulic fluid to the chambers 25 to be such that the hydraulic fluid present in the space 24 can also be replaced during heating. In this case, however, corresponding outlet lines would have to be provided.

The twisting angle α in the peripheral direction of the primary part 13 with respect to the secondary part 14, which causes the spring devices 21, which preferably at least comprise compression springs 22, to be pressed together may, by way of example, be additionally limited. The limiting then takes place by providing corresponding stops 30 on the secondary part 14. These stops 30 are produced by means of the slots 29 in the secondary part 14, which are arranged at a specific diameter in the peripheral direction and are preferably distributed at regular intervals. For this purpose, the secondary part 14 is assigned projections 31 in the region of the diameter D3 on the primary part 13, which projections, in the installed position, project into the cutouts or slots 29 in the secondary part 14. The projections 31 are to be designed in such a manner that the slots 29 can be displaced without problems in the peripheral direction with respect to the projections. It is also conceivable to assign the function of the projection-bearing element to the secondary part 14 and to provide the cutouts on the primary part 14. Friction between the two, i.e. the projections of the secondary part 14 or of the primary part 13, is to be avoided. The projections themselves may be components of the secondary part 14 or of the primary part 13, i.e. may form a structural unit with these elements, or may be designed as additional components, which are coupled to the primary part or the secondary part. In the situation illustrated, the connecting elements 27, which connect the first part 19 of the primary part to the housing part 18, can fulfill the function of these projections. The connecting element or elements 27 extend beyond the slots 29 in the secondary part 14. The slots 29, which extend in the peripheral direction on the secondary part 14, then form the stop 30 for the connecting element 27 which, in the event of a relative movement of the primary part 13 with respect to the secondary part 14, limits the possible twisting angle α. The twisting angle α is limited by the extent l of the slots 29 in the peripheral direction. The use of connecting elements to produce this stop or limiting function for the twisting angle α makes it possible to create a compact system with simple components which are easy to exchange.

In this respect, FIG. 3b illustrates part of a view onto the secondary part 14 corresponding to FIG. 3a. The slots 29, the extent of the slots 29 in the peripheral direction, the connecting elements 27 and the recesses for receiving the spring devices 21 can be seen from this figure. The same recesses are also situated on the adjoining regions of the primary part 13 in the installed position. These are in that case denoted by 32 and 33 for the second part 18 of the primary part 13.

In the configuration illustrated in FIG. 2, the clutch output disk 8 is formed by the primary part 13 of the device for vibration damping 11. Taking account of a configuration in accordance with FIGS. 3*a* and 3*b*, in detail the second part 18, which forms the housing part, is lengthened in the radial direction, this part, as seen in the peripheral direction, being of disk-like configuration and preferably being coated with friction linings 44 on both sides, i.e. on the outer surfaces 35 and 36 of the housing part 18 which are formed in the radially lengthened region, in order to produce a friction clutch.

In a further advantageous configuration, the input side of the lockup clutch, i.e. the clutch input disk 7, is connected to a piston element 37 which, when the lockup clutch 3 is released, is displaced in the axial direction, as seen in the installed position of the starting unit 1, and, on account of the relative movement, exerts pressure on a pressure medium situated in a common housing 39, the pressure being used as a control variable for acting on the means for influencing the supply of operating medium to the speed/torque converter. The means may, for example, comprise a valve device. A housing bell 40, which is connected in a rotationally fixed manner to the pump part 4 of the speed/torque converter 2, preferably forms a structural unit therewith, and which is assigned a cover element 41, functions as the common housing 39.

Figure 4A:
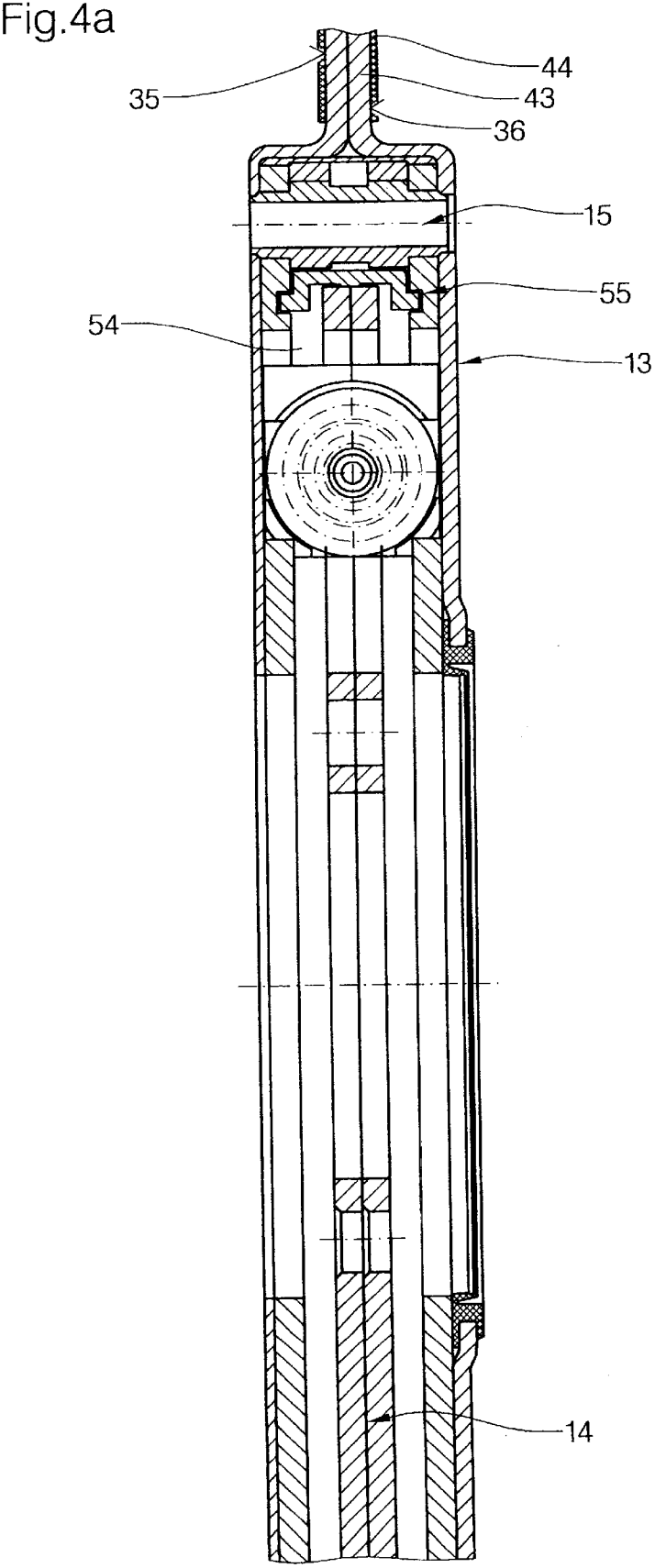

Further embodiments of the device for vibration damping 11 are conceivable, for example as described in the document DE 39 23 749 C1 which corresponds to U.S. Pat. No. 5,194,045. The content of disclosure of this document with regard to the design of the device for vibration damping with floating damping ring is hereby incorporated in its entirety in the content of disclosure of the present application. In this embodiment, which is illustrated in axial section in FIG. 4*a*, what is known as a floating damping ring 55, which is not connected in a positively locking manner to either the primary part 13 or the secondary part 14, is arranged in the interior space 54, which is filled with a damping medium, between the two components primary part 13 and secondary part 14. The basic structure of the way in which the device for vibration damping 11 is incorporated in the starting unit 1 corresponds to that described in FIG. 2. FIG. 4*b* shows a corresponding side view of the device for vibration damping 11. The floating damping ring 55 forms at least one first displacement chamber 56 with the first component, for example the primary part 13, and at least one second displacement chamber 57 with the second component, i.e. the secondary part 14. In this way, the floating damping ring 55 is exposed to the free play of forces during the relative movement of primary part 13 and secondary part 14; it can be rotated to a limited extent with respect to each of the two components. Taking account of the dead mass of the floating damping ring 55 and of the gap cross sections available, it is then possible, in the event of low vibration amplitudes, for only one displacement chamber, for example 56, to be active in the damping, while, in the case of high vibration amplitudes, in particular including in the event of a relatively low vibration frequency, the second displacement chamber, in this case 57, is active, namely whenever the limited ability of the floating damping ring 55 to rotate with respect to one of the two components—13 or 14—has been fully utilized and the ability to rotate with respect to the other component—14 or 13—is still available. The damping ring 55 itself may of single-part or, alternatively, multipart design in the peripheral direction. A multipart design in the axial direction is also conceivable.

The design options with regard to the combination of a lockup clutch 3, a hydrodynamic speed/torque converter 2 and a torsional vibration damper 12 which are illustrated in FIGS. 1 to 3 represent possible embodiments, to which, however, the scope of protection of the present application is not restricted. The combination of lockup clutch, speed/torque converter and torsional vibrator damper and the integration in a modular unit offers the advantage of satisfying a wide range of different demands with one drive component, with, at the same time, a small overall size being combined with a high functionality and a low structural outlay. The modular unit can be prefabricated in preassembled form and sold as an independent drive component. It then merely needs to be integrated into existing transmission concepts or multiple transmission concepts. In the most simple case, the application to further speed/torque conversion devices may be effected by producing a non-positively and/or positively locking coupling. The specific structural design of the coupling possibilities for the individual components to one another and to the drive or to the output of the starting unit is left up to the person skilled in the relevant field.

| | List of reference symbols |
|---|---|
| 1 | Starting unit |
| 2 | Hydrodynamic speed/torque converter |
| 3 | Lockup clutch |
| 4 | Pump wheel |
| 5 | Turbine wheel |
| 6 | Stator |
| 7 | Clutch input disk |
| 8 | Clutch output disk |
| 9 | Drive |
| 10 | Output |
| 11 | Device for vibration damping |
| 12 | Hydraulic torsional vibration damper |
| 13 | Primary part |
| 14 | Secondary part |
| 15 | Means for damping coupling |
| 16 | Means for spring coupling |
| 17.1, 17.2 | Disk-like elements |
| 18 | Housing part |
| 19 | First part of the primary part 13 |
| 20 | Recess |
| 21 | Spring device |
| 22 | Spring element |
| 23 | Spring cup |
| 24 | Intermediate space |
| 25 | Chamber |
| 26 | Damping chamber |
| 27 | Connecting element |
| 28 | Sleeve |
| 29 | Slot |
| 30 | Stop |
| 31 | Projection |
| 32 | Recess |
| 33 | Recess |
| 35, 36 | Side faces |
| 37 | Piston element |
| 38 | Means for influencing the supply of operating medium |
| 39 | Housing |
| 40 | Housing bell |
| 41 | Cover part |
| 43 | Disk-like element |
| 44 | Friction lining |
| 45 | Adapter element |
| 46 | Toothing |
| 47 | Internal toothing of secondary part |
| 48 | External toothing of adapter element |

-continued

| List of reference symbols | |
|---|---|
| 49 | Rotationally fixed connection between adapter element and output |
| 50 | Rotationally fixed coupling between turbine wheel and adapter element |
| 51 | Housing |
| 52 | Bearing arrangement |
| 53 | Cutout |
| 54 | Interior space |
| 55 | Floating damping ring |
| 56 | First displacement chamber |
| 57 | Second displacement chamber |

What is claimed is:

1. A starting unit for use in a drive system for a vehicle, comprising:
   a hydrodynamic speed/torque converter comprising a pump wheel and a turbine wheel cooperating with each other, and a stator with respect to which the pump and turbine wheels rotate;
   a lockup clutch having an output end,
   a torsional vibration damper with hydraulic dampening for damping vibrations, the damper comprising a primary part and an adjacent secondary part which are rotatable in the peripheral direction relative to each other, the primary and secondary parts including a damping coupling and a spring coupling, the damping coupling comprises a damping chamber formed between the primary and secondary parts and which is tillable with a damping medium;
   an annular element which is free of a positive locking connection with both of the primary and the secondary parts and the annular element is arranged in the damping chamber;
   the starting unit having an output end which is rotatable; the vibration damper being connected to the output end of the starting unit;
   the speed/torque converter having an output end; the output ends of the clutch and the converter being at least indirectly connected to one another in a rotationally fixed manner;
   the vibration damper is connected functionally downstream of the lockup clutch;
   the lockup clutch comprises a disk clutch which comprises a clutch input disk and a clutch output disk which are operable into connection with one another at least indirectly;
   the clutch output disk comprising an element of the torsional vibration damper.

2. The starting unit of claim 1, wherein the lockup clutch and the hydrodynamic speed/torque converter are connected in parallel to the output end of the starting unit.

3. The starting unit of claim 1, wherein the torsional vibration damper is arranged between the lockup clutch and the speed/torque converter.

4. The starting unit of claim 1, wherein the lockup clutch and the torsional vibration damper are a modular unit.

5. The starting unit of claim 1, further comprising separate chambers spaced apart from one another and formed between the primary and secondary parts of the vibration damper for respectably containing the damping coupling and the spring coupling and the damping coupling comprises means for influencing damping performance.

6. The starting unit of claim 5, wherein the means for influencing damping performance is in the damping chamber.

7. The starting unit of claim 6, wherein the means for influencing damping performance comprises a throttle point in the damping chamber.

8. The starting unit of claim 1, further comprising dividing elements for limiting the twisting angle between the primary part and the secondary part of the damper, the dividing elements dividing the damping chamber into two part-chambers each of a size which can be varied and the dividing elements also forming a throttle point between the two part-chambers.

9. The starting unit of claim 8, further comprising the dividing elements further comprising at least one projection arranged on the secondary part; and
   a cut-out on the primary part in which the projection engages in the peripheral direction so that the projection can be displaced relative to the primary part, the cut-out forming stops in the peripheral direction for engaging and cooperating with the projection.

10. The starting unit of claim 9, wherein one of the primary and secondary parts comprises a plurality of part elements and a connecting element for coupling the part elements to one another; the projection being formed by the connecting element.

11. The starting unit of claim 10, wherein the connecting element has the form of a screw.

12. The starting unit of claim 11, wherein the spring coupling comprises a compression spring which is active in the peripheral direction between the primary and secondary parts of the damper.

13. The starting unit of claim 12, wherein the primary part has first recesses extending in the peripheral direction and the secondary part has second recesses which in the installed position are substantially complementary in spacing, size and location to the first recesses in the primary part for the first and second recesses to cooperate; the spring has a guide body at each end thereof on which the primary part and the secondary parts engage tangentially in the region of the first and second recesses.

14. The starting unit of claim 1, wherein the damping chamber between the primary and secondary parts of the damper is fillable with a damping medium and the chamber is formed by a partial region of an interior space between the primary part and the secondary part;
   the annular element in the damping chamber forms first displacement chambers with the primary part and second displacement chambers with the secondary part.

15. The starting unit of claim 1, wherein the lockup clutch comprises a disk clutch of a multi-disk design.

16. The starting unit of claim 5, further comprising a common housing in which the lock up clutch and the hydrodynamic speed/torque converter are disposed, an operating medium in the hydrodynamic speed/torque converter, and the lockup clutch turning in the operating medium of the converter.

17. The starting unit of claim 14, wherein the annular element is either of a single-part or multi-part design in the peripheral direction.

18. The starting unit of claim 14, wherein the annular element is of a multi-part design in the axial direction.

* * * * *